(12) United States Patent
Nishihara

(10) Patent No.: US 6,846,872 B2
(45) Date of Patent: Jan. 25, 2005

(54) ELASTOMER COMPOSITION CONTAINING A SOFTENING AGENT

(75) Inventor: Hajime Nishihara, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 157 days.

(21) Appl. No.: 10/223,604

(22) Filed: Aug. 20, 2002

(65) Prior Publication Data

US 2004/0039108 A1 Feb. 26, 2004

(51) Int. Cl.⁷ .................................................. C08K 5/01
(52) U.S. Cl. ........................ 524/474; 524/476; 524/484; 524/485; 524/491
(58) Field of Search ................................. 524/474, 476, 524/484, 485, 491

(56) References Cited

U.S. PATENT DOCUMENTS

| | | | |
|---|---|---|---|
| 3,904,507 A | | 9/1975 | Mills ............................ 208/14 |
| 6,087,431 A | * | 7/2000 | Uchida et al. .............. 524/490 |
| 6,153,704 A | * | 11/2000 | Kodama et al. ............ 525/240 |
| 6,673,857 B1 | * | 1/2004 | Knoll et al. ................. 524/315 |

FOREIGN PATENT DOCUMENTS

| | | |
|---|---|---|
| EP | 0 751 182 A1 | 1/1997 |
| JP | 7-11067 A | 1/1995 |
| JP | 8-120127 A | 5/1996 |
| JP | 9-137001 A | 5/1997 |

* cited by examiner

*Primary Examiner*—Peter D. Mulcahy
(74) *Attorney, Agent, or Firm*—Birch, Stewart, Kolasch & Birch, LLP

(57) ABSTRACT

An elastomer composition comprising a softening agent (A) comprising a naphthenic hydrocarbon and optionally at least one selected from the group consisting of an aromatic hydrocarbon and a paraffinic hydrocarbon, and an elastomer (B) comprising a crosslinkable elastomer, wherein said softening agent (A) has a ratio of an amount of the paraffinic hydrocarbon $C_P$ and an amount of the naphthenic hydrocarbon $C_N$, $C_P/CN_N$, which are specified by ASTM D2140-97, of not less than 0 and not more than 1.5, and an amount of the aromatic hydrocarbon $C_A$ of not less than 0% and not more than 5% based on an amount of hydrocarbons in the whole softening agent.

11 Claims, No Drawings

ELASTOMER COMPOSITION CONTAINING A SOFTENING AGENT

BACKGROUND OF THE INVENTION (1) Field of the Invention

The present invention relates to an elastomer composition containing a softening agent. More precisely, the present invention relates to an elastomer composition superior in appearance, bleed resistance, stability to environmental change and low temperature characteristics.

(2) Description of the Related Art thermoplastic elastomer composition obtained by, so to speak, dynamic vulcanization, that is crosslinking during melt mixing of a radically crosslinkable elastomer and a radically non-crosslinkable resin such as polypropylene and a softening agent in an extruder in the presence of a radical initiator, is well known technology and widely used in applications such as automotive parts.

As such rubbery composition, a dynamic vulcanization technology using an olefinic elastomer manufactured by ethylene-propylene-diene (EPDM) has been known (JP-A-8-120127, JP-A-9-137001), but is not necessarily satisfied in the market due to inferior holding of a softening agent, remaining stickiness and poor low temperature characteristics.

On the other hand, a naphthenic hydrocarbon as a softening agent is also known and disclosed in U.S. Pat. No. 3,904,507. The above hydrocarbon has problems of inferior appearance caused by coloration and poor thermal and light stabilities, although it is superior in compatibility, in particular, with an olefinic elastomer and bleed resistance. Therefore, there is a need for a thermoplastic elastomer containing a softening agent, which is acceptable for practical use and is superior in appearance, bleed resistance, stabilities to environmental change and low temperature characteristics.

SUMMARY OF THE INVENTION

An object of the present invention is, in view of the above situation, to provide an elastomer containing a softening agent without having such problems as described above and superior in appearance, bleed resistance, stabilities to environmental changes such as light and heat and low temperature characteristics.

The present inventors, after an extended study to improve the elastomer containing a softening agent, found out that an addition of a softening agent comprising a hydrocarbon with specific composition ratio surprisingly enhanced appearance, moldability, bleed resistance, stabilities to environmental changes and low temperature characteristics, and thus accomplished the present invention.

Thus, the present invention provides an elastomer composition comprising a softening agent (A) comprising a naphthenic hydrocarbon and optionally at least one selected from the group consisting of an aromatic hydrocarbon and a paraffinic hydrocarbon, and an elastomer (B) comprising a crosslinkable elastomer, wherein said softening agent (A) has a ratio of an amount of the paraffinic hydrocarbon $C_P$ and an amount of the naphthenic hydrocarbon $C_N$, $C_P/C_N$, which are specified by ASTM D2140-97, of not less than 0 and not more than 1.5, and an amount of the aromatic hydrocarbon $C_A$ of not less than 0% and not more than 5% based on an amount of hydrocarbons in the whole softening agent.

The present invention also provides a method of softening an elastomer comprising using a softening agent comprising a naphthenic hydrocarbon and optionally at least one selected from the group consisting of an aromatic hydrocarbon and a paraffinic hydrocarbon, wherein said softening agent has a ratio of an amount of the paraffinic hydrocarbon $C_P$ and an amount of the naphthenic hydrocarbon $C_N$, $C_P/C_N$, which are specified by ASTM D2140-97, of not less than 0 and not more than 1.5, and an amount of the aromatic hydrocarbon $C_A$ of not less than 0% and not more than 5% based on an amount of hydrocarbons in the whole softening agent.

The present invention further provides a softening agent comprising a naphthenic hydrocarbon and optionally at least one selected from the group consisting of an aromatic hydrocarbon and a paraffinic hydrocarbon, wherein said softening agent has a ratio of an amount of the paraffinic hydrocarbon $C_P$ and an amount of the naphthenic hydrocarbon $C_N$, $C_P/C_N$, which are specified by ASTM D2140-97, of not less than 0 and not more than 1.5, and an amount of the aromatic hydrocarbon $C_A$ of not less than 0% and not more than 5% based on an amount of hydrocarbons in the whole softening agent. The present invention yet further provides the above softening agent, wherein an absorbance at 260 nm of said softening agent is not more than 1.0.

The composition of the present invention can be used in wide applications including automotive parts, automotive interior materials, air bag cover, machinery parts, electric parts, cable, hose, belt, toy, miscellaneous goods, daily necessities, construction materials, sheet and film due to the above described superior characteristics, and thus plays a great role in the industrial world.

DESCRIPTION OF THE PREFERRED EMBODIMENTS

Hereinbelow, the present invention will be described in detail.

The elastomer composition of the present invention is composed of a softening agent (A) comprising naphthenic hydrocarbon and optionally at least one selected from the group consisting of an aromatic hydrocarbon and a paraffinic hydrocarbon, and an elastomer (B).

Here, it is important that a ratio of an amount of the paraffinic hydrocarbon $C_P$ and an amount of the naphthenic hydrocarbon $C_N$, $C_P/C_N$, in the above described softening agent (A) is not less than 0 and not more than 1.5. The above described ratio exceeding 1.5 results in significant bleeding of the softening agent and lowering in low temperature characteristics. In addition, when an amount of the aromatic hydrocarbon $C_A$ is not less than 0% and not more than 5%, preferably not less than 0% and not more than 3%, and most preferably not less than 0% and not more than 1% of whole hydrocarbons in the softening agent, appearance, bleed resistance, stabilities to environmental changes such as heat and light are improved. When the elastomer (B) is partially or completely crosslinked, holding of the softening agent in the elastomer (B) is facilitated and the above described characteristics are drastically improved.

Hereinbelow, each component of the present invention will be described in detail.

Softening Agent (A)

The softening agent (A) of the present invention is a component to provide flexibility to and improve processability and elastomeric characteristics of the elastomer (B), and comprises a naphthenic hydrocarbon and optionally at least one kind of hydrocarbon selected from the group consisting of an aromatic hydrocarbon and a paraffinic hydrocarbon.

The softening agent (A) of the present invention is a petroleum based softening agent and obtained by refining sulfuric acid sludge from petroleum.

The naphthenic hydrocarbon is a cyclic hydrocarbon and mainly controls softening performance of a polymer.

The paraffinic hydrocarbon is a non-cyclic hydrocarbon and contributes to improve stabilities to environmental changes such as heat and light.

It is important that an amount of aromatic hydrocarbon $C_A$ specified by ASTM D2140-97 is not less than 0% and not more than 5%, preferably not less than 0% and not more than 3%, and most preferably not less than 0% and not more than 1%. When it exceeds 5%, stabilities to heat and light become poor. When a ratio of the amount of paraffinic hydrocarbon $C_P$ and the amount of the naphthenic hydrocarbon $C_N$, $C_P/C_N$, is not less than 0 and not more than 1.5, plasticity is enhanced, and fluidity, bleed resistance and flexibility are improved.

The softening agent (A) of the present invention preferably has dynamic viscosity at 40° C. as specified by JIS-K2283, of 30–500 $mm^2/s$, more preferably 50–400 $mm^2/s$, and most preferably 60–300 $mm^2/s$. When the dynamic viscosity is within the above-mentioned ranges, processability is enhanced since the volatility of the softening agent (A) is suppressed.

The softening agent (A) of the present invention has an absorbance at 260 nm preferably of not more than 1.0, more preferably of not more than 0.5 and most preferably of not more than 0.2, as an index for impurity content as specified by the known absorption spectrophotometry. When the absorption is within the above-mentioned ranges, stability to heat and light is enhanced.

A composition of the softening agent (A) of the present invention can be controlled by frequency and time of purification such as distillation or sulfuric acid washing. An amount of the naphthenic hydrocarbon, in particular, depends on a degree of hydrogenation of the aromatic hydrocarbon.

An amount of the above described softening agent (A) to be formulated in the elastomer (B) is not specified, but a preferred amount is exemplified, in general, as 5–300 parts by weight, more preferably 10–100 parts by weight based on 100 parts by weight of the elastomer (B). Formulation less than 5 parts by weight does not provide sufficient softening performance, and formulation over 300 parts by weight tends to lower holding performance of the elastomer (B) for the softening agent.

Elastomer (B)

An elastomer (B) of the present invention contains a (B-1) crosslinkable elastomer as an essential component and optionally a (B-2) thermoplastic resin.

Although the elastomer of the present invention can be thermoplastic or need not be thermoplastic, it is most preferably thermopolastic.

The above described (B-1) crosslinkable elastomer is not specified whether it is used as a crosslinked state or a non-crosslinked state in a final composition. Such crosslinkable elastomer preferably has a glass transition temperature (Tg) not higher than −10° C., and such rubbery polymer includes, for example, crosslinked or non-crosslinked rubber such as diene type rubber including polybutadiene, poly(styrene-butadiene), poly(acrylonitrile-butadiene) and the like, hydrogenated rubber of the above described diene type rubber, isoprene rubber, chloroprene rubber, acrylic rubber such as poly(butyl acrylate), ethylene-propylene copolymer rubber, ethylene-propylene-non-conjugated diene terpolymer rubber (EPDM) and ethylene-octene copolymer rubber, along with a thermoplastic elastomer containing the above described rubber component.

A preferred group of the (B-1) crosslinkable elastomer of the present invention is an ethylene-α-olefin copolymer and more preferably a copolymer of ethylene and α-olefin having 3–20 carbon atoms. The α-olefin includes, for example, propylene, butene-1, pentene-1, hexene-1,4-methylpentene-1, heptene-1, octene-1, nonene-1, decene-1, undecene-1 and dodecene-1. Among others, α-olefins having 3–12 carbon atoms are particularly preferable and propylene, butene-1 and octene-1 are most preferable. An ethylene-α-olefin copolymer can optionally further contain a monomer unit having a plurality of unsaturated bonds, which preferably includes, for example, conjugated diolefin such as butadiene, isoprene; non-conjugated diolefin such as 1,4-hexadiene; cyclic diene compounds such as dicyclopentadiene and norbornene derivatives; and acetylenes, among others most preferably ethylidene norbornene (ENB) and dicyclopentadiene (DCP).

The ethylene-α-olefin copolymer as one of the (B-1) crosslinkable elastomer of the present invention is preferably the one manufactured by using a known metallocene catalyst.

The metallocene catalyst is, in general, composed of a cyclopeantadienyl derivative of IV group metals such as titanium and zirconium and a co-catalyst, and not only has high activity as a polymerization catalyst but also provides a polymer with narrower molecular weight distribution and more uniform distribution of the α-olefin having 3–20 carbon atoms as a comonomer in the copolymer, compared with a Ziegler type catalyst.

The ethylene-α-olefin copolymer as one of the (B-1) crosslinkable elastomer used in the present invention preferably has a copolymerization ratio of the α-olefin of 1–60% by weight, more preferably 10–50% by weight, and most preferably 20–45% by weight. The copolymerization ratio of the α-olefin above 60% by weight largely lowers hardness and tensile strength of the composition, whereas the ratio less than 1% by weight lowers flexibility.

Density of the (B-1) crosslinkable elastomer is preferably in a range of 0.8–0.9 $g/cm^3$. Use of the olefinic elastomer having a density within this range can provide an elastomer composition superior in flexibility and low hardness.

The ethylene-α-olefin copolymer as one of the (B-1) crosslinkable elastomer used in the present invention preferably has long chain branches. Presence of the long chain branches can realize further lower density than estimated from a ratio (% by weight) of the α-olefin copolymerized without decreasing mechanical strength, and thus provide an elastomer with low density, low hardness and high strength. Such an olefinic elastomer with long chain branches has been disclosed in U.S. Pat. No. 5,278,272 and the like.

The ethylene-α-olefin copolymer as one of the (B-1) crosslinkable elastomer also preferably has a melting point peak determined by DSC at the room temperature or above. When said copolymer has a melting point peak, it is morphologically stable in the temperature range not higher than the melting point and superior in handling without stickiness.

The elastomer (B) used in the present invention preferably has a melt index in a range of 0.01–100 g/10 min (at 190° C., under 2.16 kg load), more preferably 0.2–10 g/10 min. The melt index above 100 g/10 min provides insufficient crosslinking to a composition, whereas the melt index lower than 0.01 g/10 min is not desirable due to poor fluidity and reduced processability.

Another preferable group of the (B-1) crosslinkable elastomer of the present invention is a hydrogenated rubber. The hydrogenated rubber is a hydrogenated rubber of a homopolymer of a conjugated diene type monomer or a copolymer of a conjugated diene type monomer and an aromatic vinyl monomer, wherein not less than 50% of the total double bonds are hydrogenated. In particular, the hydrogenated rubber is preferably a hydrogenated rubber from an unsaturated rubber comprising the above described homopolymer and/or the above described copolymer, having double bonds in main and side chains, wherein not less than 50% of the total olefinic double bonds are hydrogenated. More preferably, the above described copolymer is a random copolymer.

In the above described hydrogenated rubber, optionally a monomer such as olefinic, methacrylic ester, acrylic ester, unsaturated nitrile and vinyl chloride types, which is copolymerizable with the conjugated diene, may be copolymerized.

The above described conjugated diene type monomer includes 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene, and 1,3-butadiene, isoprene and 1,3-pentadiene are preferable, and 1,3-butadiene and isoprene are most preferable.

The above described aromatic vinyl monomer includes styrene, α-methylstyrene, p-methylstyrene, t-butylstyrene, divinylbenzene, N,N-dimethyl-p-aminoethylstyrene and vinylpyridine. Styrene and α-methylstyrene are preferable. The above described aromatic monomer can be used in single or in combination of two or more thereof. Content of the aromatic vinyl monomer is preferably 0–80% by weight, more preferably 0–50% by weight, and most preferably 0–30% by weight.

In the hydrogenated rubber as the (B-1) crosslinkable elastomer, vinyl bonds of the conjugated diene monomer parts before hydrogenation may present uniformly in a molecule or in a manner of increasing or decreasing along a molecular chain, or multiple blocks with different vinyl bond contents may be contained. When an aromatic vinyl monomer or a monomer copolymerizable with the above described conjugated diene monomer is contained, such monomer may be bonded randomly in the above described conjugated diene monomer part or block type aromatic vinyl monomer or other monomer may be contained within an extent satisfying requirement on crystallinity measured by DSC described below. Content of the block type aromatic vinyl monomer is preferably not larger than 20% by weight, more preferably not larger than 10% by weight of the total aromatic vinyl monomer.

In the total double bonds of the above described hydrogenated rubber, not less than 50%, preferably not less than 90%, and most preferably not less than 95% is hydrogenated, and it is preferable that residual double bonds in a main chain is not larger than 5% and residual double bonds in a side chain is not larger than 5%. Typical examples of such rubber include partially or completely hydrogenated rubbery polymers of diene type rubber such as polybutadiene, poly (styrene-butadiene), poly (acrylonitrile-butadiene), polyisoprene and polychloroprene, and in particular, a hydrogenated butadiene type or a hydrogenated isoprene type rubber is preferable.

These hydrogenated rubber can be obtained by partially hydrogenating the above described rubber by known hydrogenating methods. The hydrogenation methods include, for example, use of triisobutylborane catalyst described in F. L. Ramp et. al, J. Amer. Chem. Soc., 83, 4672 (1961), use of toluenesulfonylhydrazide described in Hung Yu Chen, J. Polym. Sci. Polym. Letter Ed., 15, 271 (1977) or use of organocobalt-organoaluminum type catalyst or organonickel-organoaluminum type catalyst described in JP-B-42-8704. Particularly preferable hydrogenating methods include use of such catalyst as providing hydrogenation at mild conditions of low temperature and low pressure shown in JP-A-59-133203 and JP-A-60-220147, or contacting with hydrogen in an inert organic solvent in the presence of catalyst comprising a bis(cyclopentadienyl)titanium compound and a hydrocarbon compound containing sodium atom, potassium atom, rubidium atom or cesium atom shown in JP-A-62-207303.

Further, Mooney viscosity (ML) of the hydrogenated rubber measured at 100° C. is preferably 20–90, and viscosity of 5% by weight styrene solution (5% SV) at 25° C. is preferably in the range of 20–300 centipoise (cps), and particularly preferable range is 25–150 cps.

Heat quantity of an endothermic peak, as an index of crystallinity of the hydrogenated rubber, is controlled by adding a polar compound such as tetrahydrofuran or by controlling polymerization temperature. Lowering of the heat quantity of the endothermic peak is attained by increasing the amount of the polar compound or by lowering polymerization temperature and thus increasing 1,2-vinyl bonds.

The (B-1) crosslinkable elastomer used in the present invention may be used in combination of multiple types. In such cases, further improvement of processability can be obtained.

In the present invention, the (B) elastomer comprises the (B-1) crosslinkable elastomer as an essential component and optionally a (B-2) thermoplastic resin.

There is no restriction for the above described (B-2) thermoplastic resin as long as it is dispersible with the (B-1) crosslinkable elastomer. For example, the following types of thermoplastic resins can be used in single or in combination of two or more types thereof: polystyrene, polyphenylene ether, polyolefin, polyvinylchloride, polyamide, polyester, polyphenylenesulfide, polycarbonate and polymethacrylate. Polyolefin type resins such as polypropylene type resin is particularly preferable as the thermoplastic resin.

Typical examples of the polypropylene type resins suitably used in the present invention include isotactic homopolypropylene and isotactic copolymer resin (including block and random) of propylene with other α-olefin such as ethylene, butene-1, pentene-1 and hexene-1.

In the present invention, among the (B-2) thermoplastic resins, single use of a (B-2a) propylene based random copolymer such as ethylene-propylene random copolymer, or combined use of the (B-2a) and a (B-2b) propylene based block copolymer or homopolypropylene is preferable.

The (B-2a) propylene based random copolymer includes an ethylene-propylene random copolymer resin. When ethylene components are present in a main chain of the polymer, they act as crosslinking points in crosslinking reaction and thus provide characteristics as a crosslinkable type olefinic resin.

The (B-2b) propylene based block copolymer contains propylene as a main component, and it is preferable not to contain an ethylene unit in a main chain of the polymer. However, when an ethylene-α-olefin copolymer is present as a dispersing phase as in the propylene based block copolymer, it shows characteristics of a decomposition type olefinic resin.

Combination of these two types of olefinic resins, the crosslinkable type olefinic resin and the decomposition type olefinic resin, further enhances appearance and mechanical strength.

The (B-2) thermoplastic resin may be a combination of a plurality of (B-2a) and (B-2b) components.

Among the (B-2b) propylene based random copolymer resins, most preferable random copolymer resin of propylene, as a main component, with other α-olefin can be manufactured by high pressure method, slurry method, vapor phase method, mass method and solution method, and preferable polymerization catalyst includes Ziegler-Natta, single site and metallocene catalysts. When a narrow composition distribution and a molecular weight distribution are required, a random copolymerization method using a metallocene catalyst is preferable.

A typical manufacturing method for the random copolymer resin is disclosed in EP 0969043A1 or U.S. Pat. No. 5,198,401, where liquid propylene is introduced in a reactor equipped with stirrer, then catalyst is added into vapor phase or liquid phase through a nozzle. After ethylene gas or α-olefin gas is introduced into vapor phase or liquid phase of the reactor, temperature and pressure are controlled so that propylene maintain refluxing. Polymerization rate is controlled by catalyst concentration and reaction temperature, whereas copolymer composition is controlled by an addition amount of ethylene or α-olefin.

Melt index of the olefinic resin suitably used in the present invention is preferably in the range of 0.1–100 g/10 min (at 230° C., under 2.16 kg load). Melt index above 100 g/10 min gives insufficient heat resistance and mechanical strength to thermoplastic elastomer, whereas melt index lower than 0.1 g/10 min is not desirable due to giving poor fluidity and reduced moldability.

In the present invention, an amount of the (B-1) crosslinkable elastomer is preferably 1–99% by weight, more preferably 10–90% by weight, and most preferably 20–80% by weight, based on total 100% by weight of the (B-1) crosslinkable elastomer and the (B-2) thermoplastic resin.

Crosslinking Agent (C)

The elastomer composition of the present invention is preferably crosslinked by a crosslinking agent (C). The crosslinking agent (C) contains a (C-1) crosslinking initiator as an essential component and optionally a (C-2) multifunctional monomer and a (C-3) monofunctional monomer. The above described crosslinking agent (C) is used preferably in 0.001–10 parts by weight, more preferably in 0.005–3 parts by weight based on 100 parts by weight of the softening agent (A) and the elastomer (B). An amount of the crosslinking agent less than 0.001 parts by weight gives insufficient crosslinking and the amount over 10 parts by weight tends to give poor appearance and lower mechanical strength to the composition.

Here, the (C-1) crosslinking initiator includes radical initiators such as organic peroxides and/or organic azo compounds. Typical examples include peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)-cyclohexane, 1,1-bis(t-butylperoxy) cyclododecane, 1,1-bis(t-hexylperoxy)cyclohexane, 2,2-bis(t-butylperoxy)octane, n-butyl-4,4-bis(t-butylperoxy)butane and n-butyl-4,4-bis(t-butylperoxy)valerate; dialkylperoxides such as di-t-butylperoxide, dicumylperoxide, di-butylcumyl-peroxide, α, α'-bis(t-butylperoxy-m-isoplopyl) benzene, α, α'-bis(t-butylperoxy) diisopropylbenzene, 2,5-dimethyl-2,5-bis(t-butylperoxy) hexane and 2,5-dimethyl-2,5-bis(t-butylperoxy)hexyne-3; diacylperoxides such as acetylperoxide, isobutylylperoxide, octanoylperoxide, decanoylperoxide, lauloylperoxide, 3,5,5-trimethylhexanoylperoxide, benzoylperoxide, 2,4-dichlorobenzoylperoxide and m-trioylperoxide; peroxyesters such as t-butylperoxyacetate, t-butylperoxyisobutylate, t-butylperoxy-2-ethylhexanoate, t-butylperoxylaulylate, t-butylperoxybenzoate, di-t-butylperoxyisophthalate, 2,5-dimethyl-2,5-di(benzoylperoxy)hexane, t-butylperoxymaleic acid, t-butylperoxyisopropylcarbonate and cumylperoxyoctate; and hydroperoxides such as t-butylhydroperoxide, cumenehydroperoxide, diisopropylbenzenehydroperoxide, 2,5-dimethylhexane-2,5-dihydroperoxide and 1,1,3,3-tetramethylbutylperoxide.

Among these compounds, 1,1-bis(t-butylperoxy)-3,3,5-trimethylcyclohexane, di-t-butylperoxide, dicumylperoxide, 2,5-dimethyl-2,5-bis(t-butylperoxy) hexane and 2,5-dimethyl-2,5-bis(t-butylperoxy)hexyne-3 are preferable.

An amount of the above described (C-1) crosslinking initiator used in the crosslinking agent (C) is preferably 1–80% by weight, more preferably 10–50% by weight. The amount less than 1% by weight gives insufficient crosslinking, whereas the amount over 80% by weight lowers mechanical strength.

In the present invention, the (C-2) multifunctional monomer, a component of the crosslinking agent (C), preferably has a radically polymerizable functional group as a functional group. Among others, a vinyl group is particularly preferable. Number of the functional group is not less than two, and a case having not less than three functional groups in combination with the (C-3) monofunctional monomer is effective. Typical examples of the multifunctional monomers preferably used include divinylbenzene, triallylisocyanurate, triallylcyanurate, diacetonediacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinonedioxime, p,p'-dibenzoylquinonedioxime, phenylmaleimide, allylmethacrylate, N,N'-m-phenylenebismaleimide, diallylphthalate, tetraallyloxyethane and 1,2-polybutadiene. Triallylcyanurate is particularly preferable. A plurality of these multifunctional monomers may be used in combination.

An amount of the above described (C-2) multifunctional monomer used in the component (C) is preferably 1–80% by weight, more preferably 10–50% by weight. The amount less than 1% by weight gives insufficient crosslinking, whereas the amount over 80% by weight lowers mechanical strength.

The above described (C-3) monofunctional monomer used in the present invention is a vinyl type monomer added to control crosslinking reaction rate, and a radically polymerizable vinyl type monomer is preferable, including aromatic vinyl monomer, unsaturated nitrile monomer such as acrylonitrile, acrylic acid ester monomer, methacrylic acid ester monomer, acrylic acid monomer, methacrylic acid monomer, maleic anhydride monomer and N-substituted maleinimide monomer.

An amount of the above described (C-3) monofunctional monomer used in the crosslinking agent (C) is preferably 1–80% by weight, more preferably 10–50% by weight. The amount less than 1% by weight gives insufficient crosslinking, whereas the amount over 80% by weight lowers mechanical strength.

Stabilizer (D)

When an elastomer composition containing a softening agent of the present invention is required to have further improved stabilities to environmental changes such as heat and light, one or more kinds of a stabilizer (D), selected from UV absorber, hindered amine type light stabilizer, antioxidant, scavenger for active species, metal deactivator and quencher, may optionally be formulated.

An amount of the stabilizer (D) is preferably 0.05–20 parts by weight, more preferably 0.1–10 parts by weight, and most preferably 0.2–5 parts by weight based on 100 parts by weight of the elastomer (B).

An UV absorber as the stabilizer (D) is a component to absorb photo-energy to become a keto-type molecule via intramolecular proton transfer (benzophenone and benzotriazole types), or to protect from deterioration by emitting as thermal energy via cis-trans isomerization (cyanoacrylate types). Its typical examples include, 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone; benzotriazoles such as 2-(2'-hydroxy-5'-methylphenyl) benzotriazole, 2-(2'-hydroxy-5'-t-octylphenyl)benzotriazole, 2-(2'-hydroxy-3'-di-t-butylphenyl)benzotriazole, 2-(2'-hydroxy-3'-di-t-butylphenyl)-5-chlorobenzotriazole, 2-(2'-hydroxy-3'-t-5'methylphenyl)-5-chlorobenzotriazole, 2-(2'-hydroxy-3',5'-dicumylphenyl) benzotriazole and 2,2'-methylenebis(4-t-octyl-6-benzotriazolyl)phenol; benzoates such as phenylsalicylate, resorcinol mononbenzoate, 2,4-di-t-butylphenyl-3',5'-di-t-butyl-4'-hydroxybenzoate and hexadecyl-3,5-di-t-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl 2-cyano-3-methyl-3-(p-methoxyphenyl)acrylate.

A hindered amine type light stabilizer as the stabilizer (D) is a component to decompose hydroperoxide generated by photo-energy to form stable N—O. radical or N—OR and N—OH and thus stabilize it. Typical examples include, 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl)-1,2,3,4-butanetetracarboxylate, bis(1,2,2,6,6-pentamethyl-4-piperidyl)di(tridecyl)-1,2,3,4-butanetetracarboxylate, bis(1,2,2,6,6-pentamethyl-4-piperidyl)-2-butyl-2-(3',5'-di-t-butyl-4-hydroxybenzyl) malonate, polycondensate of 1-(2-hydroxyethyl)-2,2,6,6-tetramethyl-4-piperidinol/diethylsuccinate, polycondensate of 1,6-bis(2,2,6,6-tetramethyl-4-piperidylamino)-hexane/dibromoethane, polycondensate of 1,6-bis(2,2,6,6-tetramethyl-4-piperidylamino)hexane/2,4-dichloro-6-t-octylamino-s-triazine and polycondensate of 1,6-bis(2,2,6,6-tetramethyl-4-piperidylamino)hexane/2,4-dichloro-6-morpholino-s-triazine.

An antioxidant as the stabilizer (D) is a component to stabilize peroxy radicals such as hydroperoxy radical generated during thermoforming or by exposure to light or to decompose peroxides generated such as hydroperoxides. Examples are a hindered phenol type antioxidant or a peroxide decomposer. The former acts as a radical chain transfer agent and the latter decomposes peroxides generated in a system to more stable alcohols and prevents autooxidation.

Typical examples of a hindered phenol type antioxidant as the above described antioxidant include, 2,6-di-t-butyl-4-methylphenol, styrenated phenol, n-octadecyl-3-(3,5-di-t-butyl-4-hydroxyphnyl)propionate, 2,2'-methylenebis(4-methyl-6-t-butylphenol), 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 4,4'-butylidenebis(3-methyl-6-t-butylphenol), 4,4'-thiobis (3-methyl-6-t-butylphenol), alkylated bisphenol, tetrakis [methylene-3-(3,5-di-t-butyl-4-hydroxyphenyl)propionate] methane and 3,9-bis[2-[3-(3-t-butyl-4-hydroxy-5-methylphenyl)-propyonyloxy]-1,1-dimethylethyl]-2,4,8,10-tetraoxyspiro[5.5]undecane.

Typical examples of a peroxide decomposing agent as the above described antioxidant include an organophosphorous type peroxide decomposing agent such as trisnonylphenylphosphite, triphenylphosphite and tris(2,4-di-t-butylphenyl)phosphite or an organosulfur type peroxide decomposer such as dilauryl 3,3'-thiodipropionate, dimyristyl 3,3'-thiodipropionate, distearyl 3,3-thiodipropionate, pentaerythrityltetrakis(3-laurylthiopropionate), ditridecyl 3,3'-thiodipropionate and 2-mercaptobenzimidazole.

An organoepoxy compound as the above described scavenger for active species is a cycloaliphatic epoxy compound including epoxylated soybean oil, tris(epoxypropyl) isocianurate, hydroquinone diglycidyl ether, diglycidyl telephthalate, 4,4'-sulfobisphenol-polyglycidyl ether, N-glycidylphthalimide or hydrogenated bisphenol A glycidyl ether, 3,4-epoxycyclohexylmethyl-3,4-epoxycyclohexanecarboxylate, 2-(3,4-epoxycyclohexylspiro[5,5]-3,4-epoxy)cyclohexane-m-dioxane, bis(3,4-epoxycyclohexylmethyl) adipate, vinylcyclohexenedioxide, 4-vinylepoxycyclohexane, bis(3,4-epoxy-6-methylcyclohexylmethyl) adipate, 3,4-epoxy-6-methylcyclohexyl-3,4-epoxy-6-methylcyclohexanecarboxylate, methylenebis(3,4-epoxycyclohexane), dicyclopentadieneepoxide, di(3,4-epoxycyclohexylmethyl)ether of ethylene glycol, ethylenebis(3,4-epoxycyclohexane carboxylate), dioctyl epoxyhexahydrophthalate and di-2-ethylhexyl epoxyhexahydrophthalate.

A metal deactivator as the stabilizer (D) is a component to form a chelate compound so as to deactivate heavy metals in a resin in the chelate compound. Its typical example includes acid amine derivatives, benzotriazole and derivatives thereof.

A quencher as the stabilizer (D) is a component to deactivate functional groups such as hydroperoxide and carbonyl group photoexited in a polymer by energy transfer, and organonickels and the like are known.

When the (B-2) thermoplastic resin, among others, an olefinic resin is used in the present invention, it is preferable that the (B-2) thermoplastic resin in said composition shows a specific crystallinity. That is, when crystallization temperature of (B-2) in said composition as determined by differential scanning calorimetry (DSC method) is in the range of 110–150° C. and heat quantity of crystallization of (B-2) is in the range of 30–200 J/g, heat resistance of a hydrogenated rubber composition is improved. A method for controlling crystallinity include manufacturing of a composition in accordance with the present invention by using an olefinic resin with a high crystallinity, satisfying requirements of the present invention, and manufacturing of a composition in accordance with the present invention by adding a crystallinity improving agent using an olefinic resin with low crystallinity not satisfying requirements of the present invention, and thus control methods are not restricted.

A typical crystallinity improving agent described above is a nucreator which is classified into phosphate salt types, sorbitol types and carboxylate salt types or an inorganic filler.

A typical example of the above described nucleator includes, sodium 2,2'-methylenebis(4,6-di-t-butylphenyl)

phosphate, bis(p-methylbenzylidene) sorbitol and bis(p-ethylbenzylidene) sorbitol. And a typical example of the above described inorganic filler includes, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide and tungsten oxide, each alone or as composites (alloy); aluminum hydroxide, magnesium hydroxide, dolomaite, hydrotalcite, zeolite, calcium hydroxide, barium hydroxide, basic magnesium carbonate, zirconium hydroxide; hydrates of an inorganic metal compound such as hydrate of tinoxide; zinc borate, zinc metaborate, barium metaborate, zinc carbonate, magnesium carbonate, calcium carbonate, barium carbonate, kaoline, montmorillonite, bentonite, clay, mica and talc. Among others, plate like fillers are preferable, and talc, mica and kaolin are particularly preferable.

An amount of the above described crystallinity improving agent is preferably 0.01–200 parts by weight, more preferably 0.1–150 parts by weight, most preferably 0.1–100 parts by weight, and extremely preferably 0.1–50 parts by weight based on total 100 parts by weight of the (B-1) crosslinkable elastomer and the (B-2) thermoplastic resin.

In the present invention, when wear resistance is required, polyorganosiloxane with dynamic viscosity of not less than 5000 centistokes at 25° C., as specified by JIS-K2410, may optionally be added.

The above described polyorganosiloxane may be in a state from viscous syrup to gum, and not specifically restricted as long as the polymer contains siloxane units substituted with alkyl, vinyl and/or aryl group. Polydimethylsiloxane, among others, is most preferable, Dynamic viscosity (25° C.) of the polyorganosiloxane used in the present invention is preferably not less than 5000 CS, more preferably not less than 10,000 CS and less than 10,000,000 CS and most preferably not less than 50,000 CS and less than 2,000,000 CS.

An addition amount of polyorganosiloxane in the present invention is preferably 0.01–20 parts by weight, more preferably 0.1–10 parts by weight, and most preferably 0.5–5 parts by weight based on total 100 parts by weight of the (B-1) crosslinkable elastomer and the (B-2) thermoplastic resin.

Inorganic fillers and plasticizers may be contained in the composition of the present invention within the level not impairing its features. The inorganic fillers used in the present invention include, for example, calcium carbonate, magnesium carbonate, silica, carbon black, glass fiber, titanium oxide, clay, mica, talk, magnesium hydroxide and aluminum hydroxide. In addition, the plasticizers include, for example, polyethylene glycol and phthalates such as dioctyl phthalate (DOP). Further, other additives such as organic and inorganic pigments, heat stabilizer, antioxidant, UV absorber, light stabilizer, flame retardant, silicone oil, anti-blocking agent, foaming agent, antistatic agent and anti-microbe agent can be suitably used.

For manufacturing the composition of the present invention, any typical method to be used for manufacturing usual resin compositions and elastomer compositions can be adopted such as Banbury mixer, kneader, single screw extruder and twin screw extruder. Twin screw extruder, among others, is suitably used to attain dynamic vulcanization efficiently. Twin screw extruder is more suitable for continuously manufacturing the composition of the present invention by uniformly and finely dispersing the (B-1) crosslinkable elastomer and the (B-2) thermoplastic resin, adding the softening agent (A) and other components and generating crosslinking reaction.

The composition of the present invention can be manufactured, as a suitable typical example, via following processing steps. That is: the (B-1) crosslinkable elastomer and the (B-2) thermoplastic resin are well mixed and then charged into a hopper of extruder. The crosslinking agent (C) may be added first together with (B-1) and (B-2) or may be added dividedly into middle section of extruder. The softening agent (A) may also be added from the middle section of extruder or may be added dividedly into first and middle sections. A part of (B-1) and (C) may be added at the middle section of extruder. Pellets of the composition of the present invention can be obtained by crosslinking reaction of the above described (B-1) and (C) during mixing by heat melting in extruder followed by sufficient crosslinking and mixing dispersion by melt mixing with further addition of (A) and others before taking out pellets from extruder.

Particularly preferable melt extrusion process is using a twin screw extruder having a length of L from a feed section for raw materials to die and L/D being from 5 to 100 (D is barrel diameter). Twin screw extruder preferably has multiple feed sections, that is, a main feed section and a side feed section at different distance from extruder tip, and kneading zones between these feed sections and between the tip and the feed section locating closer to the tip, wherein the length of each kneading zone is 3D–10D.

Twin screw extruder as one of manufacturing equipment used in the present invention may be any type of co-rotating or counter-rotating twin screw extruder. Screw type may also be any one of non-intermeshing, partially intermeshing and complete intermeshing types. A counter-rotating and partial intermeshing type screw is preferable for the case of uniform mixing of resins under a low shear force at low temperature. For the case of mixing requiring relatively high shear force, a co-rotating and complete intermeshing type screw is preferable. For mixing requiring further higher shear force, a co-rotating and complete intermeshing type screw is preferable.

When the composition of the present invention is a crosslinked composition comprising the (B-1) crosslinkable elastomer and the (B-2) thermoplastic resin components, in particular, control of morphology is also important to improve appearance and mechanical strength, and it is preferable that particle diameter of (B-1) is 0.01–3 μm in weight average and d1/d2 is 1–3 in number average, wherein d1 and d2 are longer and shorter particle diameters, respectively. It is necessary for (B-1) components to be present as independent particles and (B-2) components to be present as a continuous phase. To obtain such morphology, it is important, for example, to mix under high shear force and to suppress crosslinking rate. That is, it is attained by reducing an amount of the crosslinking initiator or a crosslinking coagent and adopting as low temperature as possible and as long reaction time as possible, but not lower than decomposition temperature of said crosslinking initiator. It is also attained by combined use of a multifunctional monomer and a monofunctional monomer as the crosslinking coagent. Excessive addition of the crosslinking initiator and the crosslinking coagent, or use of the crosslinking initiator and the crosslinking coagent with excessively high activity or high reaction temperature condition generate coagulation of rubbery polymer, and thus does not satisfy requirements of the present invention. Formulation of the crosslinking initiator and the crosslinking coagent into the (B-1) crosslinkable elastomer, along with absorption of small amount of the softening agent (A) into the (B-1) crosslinkable elastomer in advance, leads to a mild progress of crossliking reaction, which makes possible to generate small and uniform particles.

To suppress bleed of the components added, in particular, the softening agent (A) in the present invention, it is preferable that degree of crosslinking of the (B-1) crosslikable elastomer, measured by the following method, is 1–95% and degree of swelling is 3–100, more preferably degree of swelling is 3–20, and most preferably 3–10.

Measurement for Degree of Crosslinking and Degree of Swelling of (B-1) Crosslinkable Elastomer After weighing the weight $W_0$ of (A) in a composition ($W_0$) in advance, the composition was refluxed in 200 ml of xylene for 20 hours, then the solution was filtered through a filter and the weight ($W_1$) of swelled composition was measured. Then after the above swelled composition was vacuum dried at 100° C., its weight ($W_2$) was measured again. Based on these data, the degree of crosslinking and the degree of swelling were calculated as follows:

degree of crosslinking=$(W_2/W_0)\times 100$ (%)

degree of swelling=$W_1/W_2$

In view of morphology to suppress bleed of the softening agent (A), total volume of particles of the (B-1) crosslinkable elastomer having a size of 0.01–3 μm is preferably not more than 10% in total particle volume, more preferably not more than 5%, and most preferably not more than 3% as measured by the following method.

Measurement for Particle Diameter and Particle Volume

Particle diameter and particle volume of rubbery polymer were obtained by the following calculation methods based on individual data of 500 rubbery polymer particles in a transmission electron microscopic photograph of a composition taken by ultra thin slicing method. That is, particle diameter of each particle is determined from particle area S as $(4S/\pi)^{0.5}$. Weight average particle diameter is used as average particle diameter and the shape of a particle is expressed by d1/d2, that is the ratio of longer diameter d1 to shorter diameter d2. Particle volume is defined as $S^{1.5}$ and total particle volume is expressed by the sum of each particle volume.

Even if particles with diameters of 0.01–3 μm are present, they are regarded as one particle when they are coagulated and contacted together.

Such morphology shows that the (B-1) crosslinkable elastomer is large and composed of non-uniform particles, and to attain this morphology, it is important to make a ratio of melt viscosities of (B-1) and (B-2) large. The morphology can also be attained by increasing crosslinking rate, that is, by using (B-2) having lower molecular weight relative to that of (B-1), or by increasing an amount of a crosslinking initiator or a crosslinking coagent, and by crosslinking at as high temperature as possible and not lower than decomposition temperature of the crosslinking initiator and for as long time as possible. It is also preferable to use a multifunctioal monomer as the crosslinking coagent, and a trifunctional monomer is more preferable than a difunctional monomer. However, excessive addition of a crosslinking initiator and a crosslinking coagent, or use of a crosslinking initiator and a crosslinking coagent with excessively high activity or under high reaction temperature condition may cause coagulation of rubbery polymer and thus may fail to satisfy requirements of the present invention.

As a manufacturing method to attain improved and superior mechanical strength, it is more preferable to satisfy the following degree of mixing:

$M=(\pi^2/2)(L/D)D^3(N/Q)$ $10\times 10^6 \leq M \leq 1000\times 10^6$ wherein, L is extruder length from feed section to die (mm); D is inner diameter of extruder barrel (mm); Q is output rate (kg/h); and N is screw revolution (rpm).

It is important that degree of mixing M satisfies the above relations. M below $10\times 10^6$ reduces appearance due to enlargement of rubber particle and aggregation, whereas M over $1000\times 10^6$ lowers mechanical strength due to an excess shear force.

Further, tt is preferable that melt temperature satisfies the following equations to attain further good mechanical strength. That is, melt mixing first at melt temperature $T_2$(° C.), followed by next melt mixing at melt temperature $T_3$(° C.) In particular, in melting extruder having a length L from feed section to die, first melt mixing is carried out in extruder zone length of 0.1L–0.5L from feed section at melt temperature $T_2$ (° C.), followed by next melt mixing in the subsequent extruder zone at melt temperature $T_3$ (° C.); wherein, $T_1$ is preferably 150–250° C. and $T_1$ or $T_2$ at each melting zone of extruder may be uniform temperature or may have a temperature gradient.

$T_1$: half-life temperature (° C.) of (C-1) crosslinking initiator $T_1-100<T_2<T_1+40$ $T_2+1<T_3<T_2+200$ Thus obtained elastomer composition can be formed into various molded parts using arbitrary molding methods. Injection molding, extrusion, compression molding, blow molding, calendering and foam molding are preferably adopted.

Hereinbelow, the present invention will be described in more detail using Examples and Comparative Examples, however, the present invention should not be restricted by them. It is intended only to exemplify preferable and practical embodiments.

Test methods used for evaluations of various properties are as follows:

(1) Composition of Softening Agent

First, "Viscosity Gravity Constant" and "Refractivity Intercept" are determined as specified bellow. Then amount of aromatic hydrocarbon $C_A$, amount of naphthenic hydrocarbon $C_N$ and amount of paraffinic hydrocarbon $C_P$ are used to represent compositional index of a softening agent based on the carbon type method in accordance with ASTM D2140-97.

Viscosity Gravity Constant $(VGC) = [G + 0.0887 -$ $0.776\mathrm{loglog}(10V - 4)] / [1.8082 - 0.72\mathrm{loglog}(10V - 4)]$ wherein, G=specific gravity/15.6° C., V=viscosity (cst)/37.8° C.

Refractive Intercept (RI)=$n_D^{20}-1/2d_4^{20}$ wherein, $n_D^{20}$= refractive index/20° C., $d_4^{20}$=density/20° C.

(2) Absorbance of Softening Agent

Absorbance at 260 nm was measured in accordance with a spectrophotometry described in "Chemical Handbook", p.1053, published by Ohm Co., Ltd. (Tokyo, November 1978). The less absorbance, the less impurity content.

(3) Degree of Hydrogenation of (B-1) Crosslinkable Elastomer (%)

It was measured using the usual NMR method.

(4) Light Stability

Light stability was evaluated as an environmental change factor. It is measured in accordance with JIS K7102, using ATLAS C135W Weatherometer from ATLAS Electric Devices Co., U.S.A. Irradiation conditions are: temperature inside the tester 55° C., humidity 55%, without rain, 300 hrs with xenon light (wavelength 340 nm, energy 0.30 W/m$^2$). Color tone change is evaluated by color difference ΔE of molded parts, by L.a.b. method before and after the test, using SM color computer model SM-3 from Suga Testing Machine Co., Ltd. Japan. Smaller change in color tone means higher light stability.

(5) Bleed Resistance

It was evaluated by observing change in molded parts surface after 100 hours exposure at 120° C. atmosphere based on the following ranking.

⊚ excellent

○ good

Δ a little adhesion of oily substance at molded parts surface x much of adhesion amount of oily substance at molded parts surface, giving significant stickiness (6) Moldability Melt flow rate (MFR) was measured at 200° C. under 5 kg load, in accordance with ASTM D1238 as index of moldability.

(7) Appearance

Color tone of sheet surface was evaluated by visual examination based on the following ranking.

⊚ white

○ nearly white

Δ pale yellow x brown (8) Low Temperature Characteristics

Injection sheets with 2 mm thickness in accordance with ASTM D746 were cooled from room temperature to −100° C., then temperature at which 50% of the sample sheets broke was measured as an index of low temperature characteristics. A sheet showing lower temperature without fracture is evaluated as superior in low temperature characteristics.

Following components were used in each of Examples and Comparative Examples:

(1) Softening Agent

It was manufactured by a known refining method from sulfuric acid sludge of petroleum. Composition ratio of (1) aromatic hydrocarbon ($C_A$), (2) naphthenic hydrocarbon ($C_N$) and (3) paraffinic hydrocarbon ($C_P$) was controlled by degree of hydrogenation and frequency and time of refining such as distillation or sulfuric acid washing.

(2) Crosslinkable Elastomer

1) Copolymer of Ethylene and Octene-1 (Referred to as TPE-1)

It was manufactured using metallocene catalyst described in JP-A-3-163088. Ethylene/octene-1 composition ratio in the copolymer is 72/28 (ratio by weight).

2) Copolymer of Ethylene and Octene-1 (Referred to as TPE-2)

It was manufactured using a conventional Ziegler catalyst. Ethylene/octene-1 composition ratio in the copolymer is 72/28 (ratio by weight).

3) Copolymer of Ethylene, Propylene and Ethylidenenorbornene (ENB) (Referred to as TPE-3)

It was manufactured using metallocene catalyst described in JP-A-3-163088. Ethylene/propylene/ENB composition ratio in the copolymer is 72/24/4 (ratio by weight).

4) Blockcopolymer of Styrene, Ethylene, Butylene and Styrene (referred to as SEBS)

Commercially available hydrogenated styrene-butadiene blockcopolymer [styrene/ethylene butylene=30/70] was used.

5) Manufacturing of Hydrogenated Conjugated Diene Rubber

Butadiene/n-hexane solution (butadiene concentration of 20% by weight) was introduced at 20 l/h and n-butyl lithium/n-hexane solution (concentration of 5% by weight) was introduced at 70 ml/h into a 10 L autoclave reactor equipped with a stirrer and jacket and butadiene was polymerized continuously at 110° C. Thus obtained active polymer was deactivated with methanol and 8 L of the polymer solution was transferred to another 10 L reactor equipped with a stirrer and jacket. Then 250 mL of di-p-tolylbis(1-cyclopentadienyl)titanium/cyclohexane solution (concentration of 1 ml/L), as hydrogenation catalyst, and 50 mL of n-butyl lithium solution (concentration of 5 ml/L) were mixed at 60° C. under hydrogen pressure of 2 kg/cm$^2$ at 0° C. and added to the second reactor, followed by reaction for 30 min. under hydrogen partial pressure of 3 kg/cm$^2$. An antioxidant, 2,6-di-t-butylhydroxytoluene, was added to thus obtained hydrogenated polymer solution at the amount of 0.5 parts per polymer, then solvent was removed. Polybutadiene was hydrogenated under various hydrogenation conditions (hydrogen addition pressure, hydrogen addition temperature, hydrogenation time and catalyst amount) to manufacture hydrogenated polymer with various hydrogenation degree. Hydrogenated butadiene-styrene copolymers are obtained by similar polymerization in the manufacturing method described above by further addition of styrene. Results are shown in Table 1.

(3) Thermoplastic Resin polypropylene isotactic polypropylene from Japan Polychem Co. Ltd. (referred to as PP)

(4) Crosslinking Agent

1) Crosslinking initiator (referred to as C-1) 2,5-dimethyl-2,5-bis(t-butylperoxy)hexane from NOF CORP. (trade name: Perhexa 25B) (referred to as POX)

2) Multifunctional monomer (referred to as C-2) triallylisocianurate from Nippon Kasei Chem. Co. Ltd. (referred to as TAIC)

(5) Stabilizer

1) Hindered phenol type stabilizer (referred to as HP) n-octadecyl-3-(3,5-di-t-butyl-4-hydroxyphenyl) propionate 2) Hindered amine type stabilizer (referred to as HA) 2,2,6,6-tetramethyl-4-piperidylstearate 3) Phosphorous type stabilizer (referred to as SP) tris(2,4-di-t-butylphenyl)phosphite

EXAMPLES 1–12 AND COMPARATIVE EXAMPLES 1–2

Compositions shown in Table 1 are manufactured at temperature condition of 200° C., using twin screw extruder (40 mm φ, L/D=47), having a feed section at the middle of the barrel. A two threads screw having mixing zones before and after the feed section is used.

Thus obtained compositions are charged into T-die extruder to get 2 mm thick sheets for various evaluations. Results are shown in Table 1.

TABLE 1

|  |  | Ex. 1 | Ex. 2 | Ex. 3 | Ex. 4 | Ex. 5 | Ex. 6 | Com. Ex. 1 | Com. Ex. 2 |
|---|---|---|---|---|---|---|---|---|---|
| Composition | Content of component (A) (parts by weight) | 45 | 45 | 45 | 45 | 45 | 45 | 45 | 45 |
|  | Composition ratio of $C_A$ (parts by weight) | 0 | 1 | 5 | 0 | 0 | 0 | 0 | 12 |
|  | Composition ratio of $C_N$ (parts by weight) | 50 | 50 | 50 | 40 | 50 | 50 | 29 | 42 |
|  | Composition ratio of $C_P$ (parts by weight) | 50 | 49 | 45 | 60 | 50 | 50 | 71 | 46 |
|  | Ratio of $C_P/C_N$ | 1.00 | 0.98 | 0.90 | 1.50 | 1.00 | 1.00 | 2.45 | 1.40 |
|  | Absorption (260 nm) | 0.13 | 0.50 | 1.0 | 0.10 | 0.13 | 0.13 | 0.01 | 3.3 |
|  | Content of component (B-1) (parts by weight) | 75 | 75 | 75 | 75 | 75 | 75 | 75 | 75 |
|  | Type of component (B-1) | TPE-1 | TPE-1 | TPE-1 | TPE-1 | TPE-1 | SEBS | TPE-1 | TPE-1 |
|  | Content of component (B-2) (parts by weight) | 25 | 25 | 25 | 25 | 25 | 25 | 25 | 25 |
|  | Type of component (B-2) | PP | PP | PP | PP | PP | PP | PP | PP |
|  | Pox/TAIC ratio of component (C) | 0.5/1.0 | 0.5/1.0 | 0.5/1.0 | 0.5/1.0 | 0/0 | 0.5/1.0 | 0.5/1.0 | 0.5/1.0 |
|  | Content of component (D) (parts by weight) | 0.0 | 0.0 | 0.0 | 0.0 | 0.0 | 0.0 | 0.0 | 0.0 |
| Evaluation Results | Appearance | ◎ | ○ | ○ | ◎ | ◎ | ◎ | ○ | X |
|  | Formability(MFR) (g/10 min) | 7 | 6 | 10 | 3 | 19 | 13 | 4 | 7 |
|  | Low temp. property 50% breaking temp. (° C.) | −75 | −71 | −65 | −66 | −54 | −51 | −45 | −51 |
|  | Light stability Color difference (ΔE) | 4 | 5 | 7 | 4 | 5 | 7 | 5 | 24 |
|  | Bleed resistance | ◎ | ◎ | ○ | ○ | ○~Δ | ○~Δ | X | Δ |

|  |  | Ex. 7 | Ex. 8 | Ex. 9 | Ex. 10 | Ex. 11 | Ex. 12 |
|---|---|---|---|---|---|---|---|
| Composition | Content of component (A) (parts by weight) | 45 | 45 | 45 | 45 | 45 | 45 |
|  | Composition ratio of $C_A$ (parts by weight) | 0 | 0 | 0 | 0 | 0 | 0 |
|  | Composition ratio of $C_N$ (parts by weight) | 50 | 50 | 50 | 50 | 50 | 50 |
|  | Composition ratio of $C_P$ (parts by weight) | 50 | 50 | 50 | 50 | 50 | 50 |
|  | Ratio of $C_P/C_N$ | 1.00 | 1.00 | 1.00 | 1.00 | 1.00 | 1.00 |
|  | Absorbance (260 nm) | 0.13 | 0.13 | 0.13 | 0.13 | 0.13 | 0.13 |
|  | Content of component (B-1) (parts by weight) | 75 | 75 | 75 | 75 | 75 | 100 |
|  | Type of component (B-1) | TPE-2 | TPE-3 | TPE-1 | TPE-1 | TPE-1 | TPE-1 |
|  | Content of component (B-2) (parts by weight) | 25 | 25 | 25 | 25 | 25 | 0 |
|  | Type of component (B-2) | PP | PP | PP | PP | PP | — |
|  | Pox/TAIC ratio of component (C) | 0.5/1.0 | 0.5/1.0 | 0.5/1.0 | 0.5/1.0 | 0.5/1.0 | 0.2/0 |
|  | Content of component (D) (parts by weight) | 0.0 | 0.0 | 0.1 (HP) | 0.1 (HA) | 0.1 (SP) | 0.0 |
| Evaluation Results | Appearance | ○ | ○ | ◎ | ◎ | ◎ | ◎ |
|  | Formability(MFR) (g/10 min) | 5 | 6 | 8 | 7 | 8 | 2 |
|  | Low temp. property 50% breaking temp. (° C.) | −62 | −72 | −75 | −77 | −74 | −86 |
|  | Light stability Color difference (ΔE) | 5 | 5 | 3 | 2 | 2 | 3 |
|  | Bleed resistance | ○ | ◎ | ◎ | ◎ | ◎ | ◎ |

EXAMPLES 13–19

The same experiments are repeated except that (B-1) crosslinkable elastomer is substituted by hydrogenated rubber shown in Table 2.

Results are shown in Table 2.

TABLE 2

|  | Ex. 13 | Ex. 14 | Ex. 15 | Ex. 16 | Ex. 17 | Ex. 18 | Ex. 19 |
|---|---|---|---|---|---|---|---|
| Component (B-1) of composition | | | | | | | |
| Type | Hydrogenated rubber | Hydrogenated rubber | Hydrogenated rubber | Hydrogenated rubber | Hydrogenated rubber | Hydrogenated rubber | Hydrogenated rubber |
| Degree of hydrogenation (%) | 50 | 85 | 90 | 95 | 100 | 95 | 95 |
| Amount of double bond remaining in main chain (%) *1 | 44 | 11 | 8 | 4.5 | 0 | 4.5 | 4.5 |
| Amount of double bond remaining in side chain (%) *2 | 6 | 4 | 2 | 0.5 | 0 | 0.5 | 0.5 |
| B/S ratio *3 | 100/0 | 100/0 | 100/0 | 100/0 | 100/0 | 80/20 | 70/30 |
| Evaluation Results | | | | | | | |
| Appearance | ○ | ○ | ◎ | ◎ | ◎ | ◎ | ◎ |
| Formability (MFR) (g/10 min) | 4 | 6 | 8 | 7 | 8 | 11 | 19 |
| Low temp. property 50% breaking temp. (° C.) | −78 | −76 | −75 | −73 | −70 | −62 | −51 |
| Light stability Color difference (ΔE) | 9 | 7 | 5 | 4 | 3 | 5 | 9 |
| Bleed resistance | ◎ | ◎ | ◎ | ◎ | ◎ | ○ | ○ |

Tables 1 and 2 show that elastomer compositions containing a softening agent, satisfying requirements of the present invention, have excellent appearance, moldability, bleed resistance, light stability and low temperature characteristics. In particular, polyolefin type elastomer is preferable and, among others, an ethylene/α-olefin copolymer composed of ethylene and α-olefin with 3–20 carbon number, manufactured using metallocene catalyst, and/or hydrogenated rubber, which is unsaturated rubber comprising a homopolymer and/or a random copolymer having double bonds in main chain and side chain, whose not less than 50% of total double bonds being hydrogenated, are found to express far superiority in the above described characteristics.

What is claimed is:

1. An elastomer composition comprising a softening agent (A) comprising a naphthenic hydrocarbon and at least one selected from the group consisting of an aromatic hydrocarbon and a paraffinic hydrocarbon, and an elastomer (B) comprising a crosslinkable elastomer, wherein said softening agent (A) has a ratio of an amount of the paraffinic hydrocarbon $C_P$ and an amount of the naphthenic hydrocarbon $C_N$, $C_P/C_N$, which are specified by ASTM D2140-97, of not less than 0 and not more than 1.5, and an amount of the aromatic hydrocarbon $C_A$ of not less than 0% and not more than 5% based on an amount of hydrocarbons in the whole softening agent.

2. The elastomer composition according to claim 1 which is crosslinked.

3. The elastomer composition according to claim 1 or 2, wherein an amount of the aromatic hydrocarbon $C_A$ is not more than 1% of an amount of hydrocarbons of the whole softening agent.

4. The elastomer composition according to claim 1 or 2, wherein dynamic viscosity of the softening agent at 40° C. specified by JIS-K-2283 is 30–500 mm²/s.

5. The elastomer composition according to claim 1 or 2, wherein the elastomer composition (B) comprises a crosslinkable elastomer and a thermoplastic resin, said crosslinkable elastomer is an olefinic elastomer and/or a hydrogenated rubber and said thermoplastic resin is an olefinic resin.

6. The elastomer composition according to claim 5, wherein the crosslinkable elastomer is at least one selected from the group consisting of:

an ethylene-α-olefin copolymer comprising ethylene and α-olefin having 3–20 carbon atoms, manufactured by using a metallocene catalyst; and a hydrogenated rubber from an unsaturated rubber comprising a homopolymer of a conjugated diene monomer and/or a copolymer of said conjugated diene monomer and an aromatic vinyl monomer, having double bonds in main and side chains, wherein not less than 50% of total olefinic double bonds are hydrogenated.

7. The elastomer composition according to claim 5, wherein said thermoplastic resin is a polypropylene based resin.

8. The elastomer composition according to claim 6, wherein said thermoplastic resin is a polypropylene based resin.

9. The elastomer composition according to claim 5, wherein a stabilizing agent is further compounded.

10. The elastomer composition according to claim 6, wherein a stabilizing agent is further compounded.

11. The elastomer composition according to claim 1 or 2, wherein an absorbance at 260 nm of said softening agent is not more than 1.0.

* * * * *